Feb. 11, 1947.　　　G. W. JAMES　　　2,415,593
BATTERY
Filed April 10, 1943
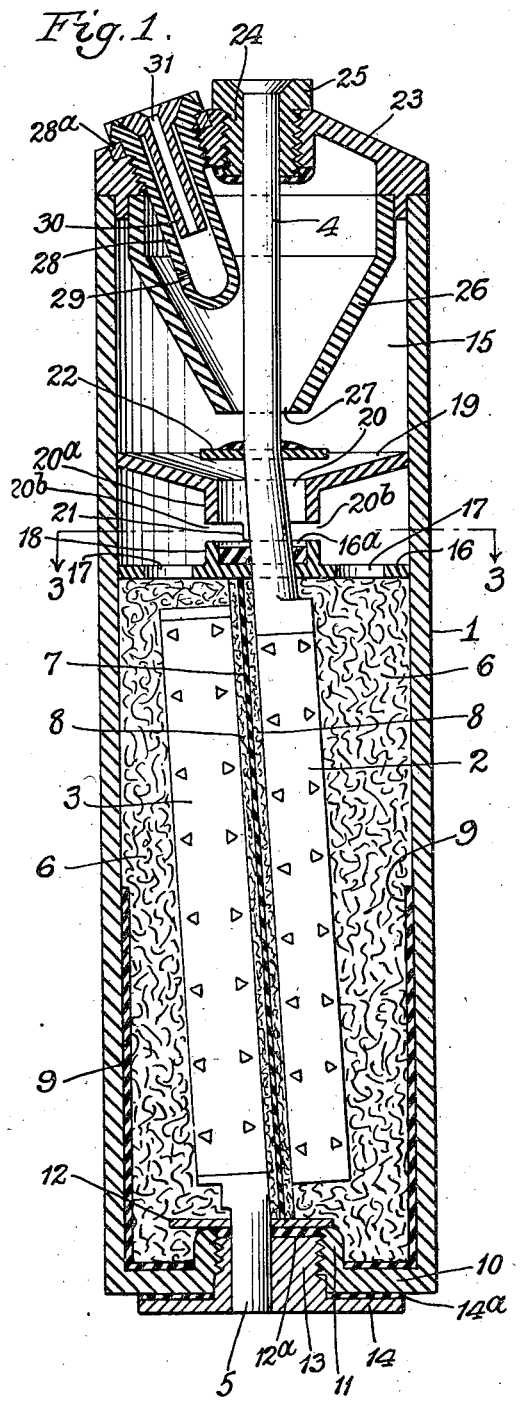
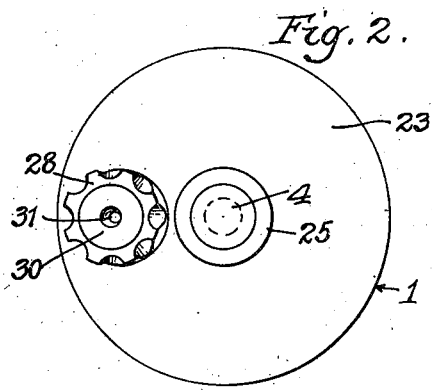
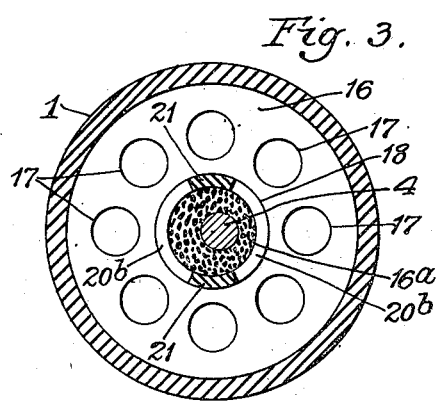
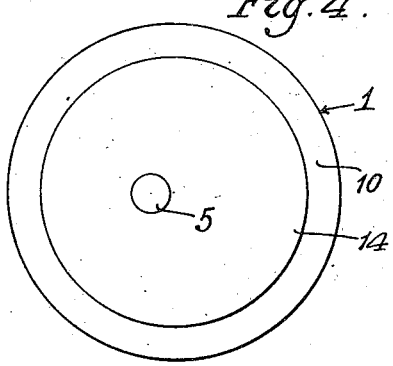
Inventor
Gerald W. James
by Parker & Carter
Attorneys.

Patented Feb. 11, 1947

2,415,593

UNITED STATES PATENT OFFICE 2,415,593

BATTERY

Gerald W. James, Sycamore, Ill., assignor, by mesne assignments, to Ideal Industries, Inc., Sycamore, Ill., a corporation of Delaware Application April 10, 1943, Serial No. 482,581

4 Claims. (Cl. 136—6)

This invention relates to storage batteries, and has for its object to provide a new and improved device of this description.

The invention has, as a further object, to provide a storage battery of the wet type.

The invention has as a further object to provide a wet type battery with means for preventing the electrolyte from leaking out at either end of the casing.

The invention has as a further object to provide a wet type battery for various uses and which is particularly adapted to be used in connection with a flashlight.

The invention has as a further object to provide an efficient, durable and self-contained wet battery which can be moved into any desired and necessary position.

The invention has further objects which are more particularly pointed out in the accompanying description.

Fig. 1 is a longitudinal sectional view through one form of battery embodying the invention.

Fig. 2 is a top plan view of the battery shown in Fig. 1.

Fig. 3 is a sectional view taken on line 3—3 of Fig. 1.

Fig. 4 is a bottom view of the battery shown in Fig. 1.

Like numerals refer to like parts throughout the several figures.

In the particular construction shown there is a casing 1, which is preferably made of some plastic material which is transparent or semi-transparent. One plastic material which gives very satisfactory results is methyl methacrylate, having a trade name "lucite." It is, of course, evident that the casing may be made of other material.

Within the casing are the plates 2 and 3, which are preferably of grid form; plate 2 being the negative plate and plate 3 the positive plate. Connected with the plate 2 is the lead 4, and connected with the plate 3 is the lead 5. Placed within the casing and surrounding the plates is an absorbent material 6 for the electrolyte. This absorbent material may be, for example, glass wool. Located between the plates 2 and 3 is a separating device which consists of material not adversely affected by the electrolyte, which may be of rubber or wood for example.

As herein shown, this device consists of the central piece 7 of rubber, having on opposite sides the woven or felted glass mats 8. There is preferably a coating of wax 9 inside the casing 1, extending from the bottom upwardly for a portion of the length of the casing. The electrolyte is absorbed by the glass wool which holds it in place and yet permits it to make proper contact with the plates 2 and 3.

The casing 1 is preferably provided with an integral bottom 10, which has an inwardly projecting recessed portion 11. Screw threaded into this recess is a metal plug 13, which has an enlarged head 14 on the exterior of the casing, and which fits tightly against the bottom of the casing when the plug is screwed into position. There is a positive stem washer 12 extending across the top of the inwardly projecting recessed portion. There is an opening through the member 12 and through the plug 13, into which the lead 5 is received and is sealed tightly therein. This sealing may be accomplished in any desired manner. As herein shown, this sealing is done by means of a pitch seal 12a which is preferably applied in a hot condition so that it covers the end of the metal plug 13 and passes down partly therealong in the screw threads and has a sealing fit with the lead 5 to insure a complete seal and prevent the escape of any liquid from the casing 1. There is also preferably a pitch seal 14a between the enlarged head 14 of the plug 13 and the bottom of the casing 1.

The glass wool 6 only partially fills the casing, there being at the top an empty space 15. Extending across the casing in proximity to the top surface of the glass wool is a washer 16, the periphery of which fits tightly against the inner surface of the casing 1, through which the lead 4 passes, preferably with a tight fit sealed by the sealing material 16a. This washer is provided with a series of openings 17 spaced around the washer and located at a distance from its periphery (see Fig. 3), and is preferably provided with a hub portion 18. A funnel member 19 is located above the washer 16 and has a tight fit at the edges with the interior face of the casing 1. This funnel has a central opening 20, and a projecting hub 20a provided with one or more projections 21, which engage the hub 18 of the washer 16.

Mounted upon the lead 4, above the opening 20 in the funnel member 19, is a baffle washer 22, which has a tight non-leaking fit with the lead 4, and which is somewhat larger than the opening 20 in the funnel member 19. The washer 16, funnel member 19, and baffle washer 22, as hereinafter set out, prevent the electrolyte from leaking out of the casing when the battery is turned upside down. The casing 1 is open at the top and is provided with a cover 23 which is arranged to have a leak-tight connection with the casing 1. This cover is provided with a central opening having interior threads, and there is a plug 24 threaded into this opening, which has an enlarged head 25 which engages the wall around the opening. The lead 4 passes through this plug and has a leak-tight connection therewith.

Connected to the cover 23 by a leak-tight connection is a funnel shaped baffle member 26, through which the lead 4 passes and which has at its end the opening 27. At one side of the opening in the cover for the plug 24 is another opening with internal screw threads into which is received a tube 28 having screw threads for engaging the screw threads of the opening. There is a washer 28a which is engaged by the enlarged end of the tube 28 so as to make a tight joint. This washer is of any suitable material such as rubber or Vinylite. This tube is open at the top and closed at the bottom, but has an opening 29 at a short distance from the bottom. Within the tube 28 is a second tube 30, which is provided with a passageway 31 extending therethrough. Water or electrolyte may be added to the casing by removing the tubes 28 and 30 and inserting the liquid through the opening thus produced. The liquid then passes through the opening 27 and into the funnel member 29 and through the openings 20 and 20b, and through the openings 17 into the space containing the glass wool 6.

If the battery is turned on its side, for example, the periphery portion of the washer 16 acts to prevent the liquid from running out. If the battery is turned upside down and there is any surplus liquid therein this liquid will pass through the openings 17 and be stopped by the funnel washer 19. If there should be sufficient liquid to fill the space between the funnel washer 19 and the washer 16 to a level beyond the openings 20b, this liquid would then pass through the opening 20 and be diverted by the washer 22 so that it would pass in between the funnel shaped baffle member 26 and the inner face of the casing 1, and thus be prevented from escaping from the casing 1. If there should be enough liquid to reach the opening 27 in the member 26, this surplus liquid would pass into the interior of the funnel shaped member 26 and would be held in the casing. If there should be sufficient liquid to rise above the opening 29 in the tube 28, the liquid would then pass into the tube 28 and still be held in the casing by the tube 30. It will thus be seen that liquid cannot escape, but that gas from the casing can escape out through the passageway 31.

The positive plate is preferably larger in volume of material than the negative plate and is usually made 25% larger in volume.

The terminal construction illustrated in the present application is claimed in my co-pending application Serial No. 555,286, filed December 22, 1944, which is a division of this application.

I claim:

1. In combination in a battery having a casing, positive and negative plates in said casing, a separating device for separating said plates, absorbent material surrounding said plates for absorbing a liquid electrolyte, a cover for said casing, a lead extending from one of said plates through said cover, a washer extending across the casing above said absorbent material and surrounding and in sealing engagement with said lead, said washer provided with an opening extending therethrough at one side of said lead, a plate located above said washer and engaging the inner face of said casing, said plate having an enlarged opening through which said lead passes and provided with a projecting hub which connects with the washer, an opening intermediate the plate and the washer through which fluid may pass, a baffle washer located above the opening in said plate and larger in diameter than said opening, said baffle washer fastened to said lead, and means above said baffle washer for permitting gas to escape but which prevents liquid from escaping when the battery is inverted.

2. In combination in a battery having a casing, positive and negative plates in said casing, a separating device for separating said plates, absorbent material surrounding said plates for absorbing a liquid electrolyte, a cover for said casing, a lead extending from one of said plates through said cover, a washer extending across the casing above said absorbent material and surrounding and in sealing engagement with said lead, said washer provided with an opening extending therethrough at one side of said lead, a plate located above said washer and engaging the inner face of said casing, said plate having an enlarged opening through which said lead passes and provided with a projecting hub which connects with the washer, an opening intermediate the plate and the washer through which fluid may pass, a baffle washer located above the opening in said plate and larger in diameter than said opening, said baffle washer fastened to said lead, and means above said baffle washer for permitting gas to escape but which prevents liquid from escaping when the battery is inverted, said casing being provided with an integral bottom which has an inwardly projecting hollow part with internal screw threads and having an opening therethrough, a plug having a screw threaded engagement with the screw threads in said projection, a lead from the other plate extending through said projection and said plug and having a sealed engagement therewith, said plug being provided with an enlarged head which fits tightly against the exterior of said bottom and a laterally extending member positioned about said last-mentioned lead and sealed thereto, said laterally extending member overlying and being sealed to the inner surface of said inwardly projecting hollow member.

3. In combination in a battery having a casing having a cover, positive and negative plates in said casing, absorbent material surrounding said plates for absorbing a liquid electrolyte, a lead extending from one of said plates through said cover, means for obstructing the passage of liquid from said casing when the battery is inverted, comprising a washer extending across the casing at the upper end of said absorbent material surrounding and in sealing engagement with said lead and provided with an opening extending therethrough, a plate extending across said casing above said washer the periphery of which engages the inner face of said casing, said plate provided with an opening through which the lead passes and which is larger than the lead, a connection between said plate and said washer, an escape opening in said connection, a baffle washer spaced above said plate and larger in diameter than the opening therethrough, said baffle washer having an opening into which said lead tightly fits.

4. In combination in a battery having a casing, positive and negative plates in said casing, absorbent material surrounding said plates for absorbing a liquid electrolyte, a cover for said casing, a lead extending from one of said plates through said cover, two separate obstructing devices for obstructing the passage of liquid from the casing through said cover when the battery is inverted, one of said obstructing devices attached to the cover and the other obstructing device comprising a washer extending entirely across the casing at the upper end of the absorbent material surrounding and in sealing engagement with said lead and provided with an opening extending therethrough, a plate extending across the casing above said washer separated therefrom by a space, and having an enlarged opening through which the lead passes, which opening is larger than the lead, an escape opening connecting the opening in said plate with the space between said washer and plate.

GERALD W. JAMES.

REFERENCES CITED

The following references are of record in the file of this patent:

UNITED STATES PATENTS

| Number | Name | Date |
|---|---|---|
| 1,201,074 | Mortimer et al. | Oct. 10, 1916 |
| 1,352,619 | Norris | Sept. 14, 1920 |
| 287,812 | Felton | Nov. 6, 1883 |
| 397,945 | Sperry | Feb. 19, 1889 |
| 1,183,009 | Hirsch | May 16, 1916 |
| 1,603,443 | Benner | Oct. 19, 1926 |
| 2,266,686 | Emanuel | Dec. 16, 1941 |
| 1,583,871 | Davis | May 11, 1926 |
| 673,900 | Darling | May 14, 1901 |
| 1,454,571 | Thorpe | May 8, 1923 |
| 406,223 | Lee | July 2, 1889 |
| 2,000,199 | Stanley | May 7, 1935 |

OTHER REFERENCES

Quirk "Directions," Effective Aug. 15, 1941, 1 page. (Copy in Division 60, class 136—6.3.)